United States Patent
Fujii et al.

(10) Patent No.: US 7,844,083 B2
(45) Date of Patent: Nov. 30, 2010

(54) METHOD FOR ACQUIRING PERSONAL IDENTIFICATION DATA, PERSONAL IDENTIFICATION METHOD, APPARATUS FOR ACQUIRING PERSONAL IDENTIFICATION DATA, AND PERSONAL IDENTIFICATION APPARATUS

(75) Inventors: Hitoshi Fujii, Fukuoka (JP); Naoki Konishi, Fukuoka (JP)

(73) Assignees: Kyushu Institute of Technology, Fukuoka (JP); Syscom Japan, Inc., Fukuoka (JP)

( * ) Notice: Subject to any disclaimer, the term of this patent is extended or adjusted under 35 U.S.C. 154(b) by 1006 days.

(21) Appl. No.: 11/646,349

(22) Filed: Dec. 28, 2006

(65) Prior Publication Data

US 2007/0177772 A1    Aug. 2, 2007

Related U.S. Application Data

(63) Continuation-in-part of application No. 10/596,975, filed as application No. PCT/JP2005/009913 on May 31, 2005.

(30) Foreign Application Priority Data

Jun. 18, 2004    (JP)    .............................. 2004-181221

(51) Int. Cl.
*G06K 9/00*    (2006.01)

(52) U.S. Cl. ......................... 382/115; 600/504; 600/587

(58) Field of Classification Search ................. 382/115, 382/124; 600/478, 504, 508, 587
See application file for complete search history.

(56) References Cited

U.S. PATENT DOCUMENTS 6,944,494 B2 *    9/2005    Forrester et al.    ............ 600/478

2002/0028004 A1 *    3/2002    Miura et al.    ................. 382/124
2002/0048014 A1 *    4/2002    Kono et al.    .................... 356/71

(Continued)

FOREIGN PATENT DOCUMENTS

JP    1-124437 A    5/1989

(Continued)

OTHER PUBLICATIONS

Sahin Kaya Ozdemir et al, "Self-Mixing Laser Speckle Velocimeter for Blood Flow Measurement", Oct. 2000, IEEE Transactions on Instrumentation and Measurement, vol. 49, No. 5 pp. 1029-1034.*

(Continued)

*Primary Examiner*—Gergory M Desire
(74) *Attorney, Agent, or Firm*—Sughrue Mion, PLLC

(57) ABSTRACT

The present invention provides a method for acquiring personal identification data by extracting a ridge-and-recess pattern corresponding to a fingerprint or a knuckle joint and lines on a palm by utilizing characteristics by which subcutaneous bloodstream distribution is spatially modulated by the ridge-and-recess pattern on the surface when measuring a subcutaneous bloodstream distribution based on a bloodstream measuring technology utilizing laser scattering, and by acquiring the same as personal identification data based on living body information, and the same method for acquiring personal identification data includes the steps of: irradiating a laser beam onto at least a part of a fingertip surface or a palm; imaging reflection light from subcutaneous blood vessel layers at an irradiation spot to which a laser beam is irradiated by receiving the same on an image sensor as laser speckles; calculating a change ratio of a light-receiving amount at respective pixels of the laser speckles; preparing a two-dimensional bloodstream map of the irradiation spot based on the numerical values obtained in the step of calculating a change ratio of a light-receiving amount; and storing a ridge-and-recess pattern of the irradiation spot appearing in the two-dimensional bloodstream map as personal identification data.

12 Claims, 2 Drawing Sheets

U.S. PATENT DOCUMENTS

| | | | |
|---|---|---|---|
| 2006/0177107 A1* | 8/2006 | Ishii | 382/115 |
| 2007/0036399 A1* | 2/2007 | Matsumura et al. | 382/124 |
| 2007/0086629 A1* | 4/2007 | Drews et al. | 382/124 |
| 2007/0177772 A1* | 8/2007 | Fujii et al. | 382/115 |
| 2007/0263906 A1* | 11/2007 | Fujii et al. | 382/115 |
| 2008/0234590 A1* | 9/2008 | Akkermans et al. | 600/504 |

FOREIGN PATENT DOCUMENTS

| | | |
|---|---|---|
| JP | 2-5190 A | 1/1990 |
| JP | 4-242628 A | 8/1992 |
| JP | 5-73666 A | 3/1993 |
| JP | 5-28133 B | 4/1993 |
| JP | 5-28134 B | 4/1993 |
| JP | 8-16752 A | 1/1996 |
| JP | 8-112262 A | 5/1996 |
| JP | 2001-266134 A | 9/2001 |
| JP | 2003-144420 A | 5/2003 |
| JP | 2003-164431 A | 6/2003 |
| JP | 2003-180641 A | 7/2003 |
| JP | 2003-331268 A | 11/2003 |

OTHER PUBLICATIONS

International Search Report for PCT/JP2005/009913; dated Jun. 28, 2005.

* cited by examiner

METHOD FOR ACQUIRING PERSONAL IDENTIFICATION DATA, PERSONAL IDENTIFICATION METHOD, APPARATUS FOR ACQUIRING PERSONAL IDENTIFICATION DATA, AND PERSONAL IDENTIFICATION APPARATUS

CROSS REFERENCE TO RELATED APPLICATIONS

This application is a continuation-in-part of U.S. application Ser. No. 10/596,975 filed Apr. 2, 2007, which is the National Stage of PCT/JP2005/009913 filed May 31, 2005, which claims priority from Japanese Patent Application No. JP 2004-181221, filed Jun. 18, 2004, the contents of which is incorporated herein by reference.

TECHNICAL FIELD OF THE PRESENT INVENTION

The present invention relates to a method for acquiring personal identification data, a personal identification method, an apparatus for acquiring personal identification data, and a personal identification apparatus, which carry out acquisition and identification by measuring subcutaneous bloodstream, and in particular, to a method for acquiring personal identification data, a personal identification method, an apparatus for acquiring personal identification data, and a personal identification apparatus, which carry out acquisition and identification by utilizing, as personal identification data, ridge-and-recess patterns corresponding to a fingerprint, a knuckle joint and lines on a palm based on a two-dimensional bloodstream map of a fingertip surface or a part of a palm.

BACKGROUND ART

In regard to specified personal identification based on a fingerprint, various methods for inputting ridge-and-recess patterns of a fingerprint into a computer as an image by using laser beams and analyzing the same have been developed in place of an older visual identifying method.

A number of methods have been proposed as a method for detecting a fingerprint. As in (Patent Document 1) and (Patent Document 2), an optical method for directly picking up a ridge-and-recess pattern of a fingerprint into an image sensor by combining differences in the scattering angle between a ridge and a recess of the fingerprint with all the reflection conditions and a method for extracting a ridge-and-recess pattern of a fingerprint by utilizing a semiconductor sensor that detects a difference in electrolytic distribution on a contact surface have been used in practice.

In addition, as in (Patent Document 3), a method for extracting a venous pattern of a fingertip and palm by utilizing a near-infrared light and for identifying a specified person has been proposed and have been commercialized.

On the other hand, when a laser beam is irradiated onto a living body, the intensity distribution of the reflected and scattering light dynamically changes due to moving scattering particles such as blood cells, and forms laser speckles (that is, a random speckle pattern) on the image-forming surface. It has been known that bloodstream distribution of capillary vessels in the vicinity of the surface of a living body may be made visible as an image by detecting the laser speckle pattern by an image sensor on the image-forming surface, and displaying the change with the passage of time (hereinafter merely called "time change") of the laser speckle pattern in a two-dimensional map by quantifying the time change at respective pixels.

The present applicant disclose a method and an apparatus for measuring subcutaneous bloodstream and eyeground bloodstream and displaying the same as a two-dimensional bloodstream map in (Patent Document 4) through (Patent Document 9).

(Patent Document 1) Japanese Published Unexamined Patent Application No. H5-73666
(Patent Document 2) Japanese Published Unexamined Patent Application No. H8-16752
(Patent Document 3) Japanese Published Unexamined Patent Application No. 2003-331268
(Patent Document 4) Japanese Published Examined Patent Application No. H5-28133
(Patent Document 5) Japanese Published Examined Patent Application No. H5-28134
(Patent Document 6) Japanese Published Unexamined Patent Application No. H4-242628
(Patent Document 7) Japanese Published Unexamined Patent Application No. H8-112262
(Patent Document 8) Japanese Published Unexamined Patent Application No. 2003-164431
(Patent Document 9) Japanese Published Unexamined Patent Application No. 2003-186041

DISCLOSURE OF THE PRESENT INVENTION

Objects to be Solved by the Present Invention

However, in the technologies described above, there are the following problems.

(1) In the method for identifying a specified person based on a ridge-and-recess pattern of a fingerprint as in (Patent Document 1) and (Patent Document 2), since, if the fingerprint is taken as a mold, the shape can be fabricated, there is a problem in that the reliability is insufficient.

(2) In the method for identifying a specified person based on a venous pattern of a fingertip or a palm as in (Patent Document 3), since the image is acquired for identification by utilizing absorption of a near-infrared light, identification can be carried out without any bloodstream if a pattern for absorbing a near-infrared light is produced in accordance with the same pattern as the venous pattern, wherein it is easy to falsify because it is possible to identify without bloodstream, and there is a problem in that the reliability is insufficient.

(3) Each of invention of (Patent Document 4) through (Patent Document 9) measures subcutaneous or eyeground bloodstream and displays the same as a two-dimensional bloodstream map. Up until now, there has been no concept of combining subcutaneous bloodstream with the fingerprint on the surface thereof or a ridge-and-recess pattern corresponding to a knuckle joint and lines on a palm and using the same for personal identification, wherein each of the Patent Documents makes no disclosure or suggestion with respect to the method and apparatus therefore.

The present invention was developed to solve the above-described conventional problems, and it is therefore an object of the present invention to provide: a method for acquiring personal identification data by extracting a ridge-and-recess pattern corresponding to a fingerprint or a knuckle joint and lines on a palm by utilizing characteristics by which subcutaneous bloodstream distribution is spatially modulated by the ridge-and-recess pattern on the surface when measuring a subcutaneous bloodstream distribution based on a bloodstream measuring technology utilizing laser scattering, and by acquiring the same as personal identification data based on living body information; a personal identification method, having high reliability, high accuracy and less likelihood of falsification, capable of carrying out composite personal identification by comparing the personal identification data acquired by the method for acquiring personal identification data with pre-registered personal identification data; an apparatus for acquiring personal identification data, the structure of which is simplified and handling of which is easy, capable of preparing a two-dimensional subcutaneous bloodstream map of a fingertip surface and at a palm, and capable of acquiring the ridge-and-recess pattern appearing in the two-dimensional bloodstream map as personal identification data based on the living body information; and a personal identification apparatus, having high accuracy, high reliability and less likelihood of falsification, capable of acquiring the ridge-and-recess pattern appearing in the two-dimensional subcutaneous bloodstream map of a fingertip surface and at a palm as personal identification data based on the living body information, comparing the same with pre-registered personal identification data of persons, and carrying out composite personal identification.

Means for Solving the Objects

In order to solve the above-described object, a method for acquiring personal identification data, a personal identification method, an apparatus for acquiring personal identification data, and a personal identification apparatus have the following constructions.

A method for acquiring personal identification data according to the present invention is a method for acquiring personal identification data to identify a specified person by measuring subcutaneous bloodstream, including the steps of: irradiating a laser beam onto at least a part of a fingertip surface or a palm; receiving light reflected from subcutaneous blood vessel layers at an irradiation spot to which a laser beam is irradiated in the laser beam-irradiating step and imaging the same on an image sensor as laser speckles; calculating a change ratio of a light-receiving amount at respective pixels of the laser speckles; preparing a two-dimensional bloodstream map of the irradiation spot based on numerical values obtained in the step of calculating a change ratio of a light-receiving amount; and storing a ridge-and-recess pattern of the irradiation spot appearing in the two-dimensional bloodstream map as personal identification data.

With the constructions, the following actions can be brought about.

(1) Since a laser beam can be selectively irradiated onto an optional range at an optional position of a fingertip surface or a palm by the laser beam-irradiating step, and light reflected from the subcutaneous blood vessel layers at the spot where a laser beam is irradiated may be received by and imaged on the image sensor as laser speckles by the imaging step, it is possible to simply prepare a two-dimensional bloodstream map of the irradiation spot by the step of preparing a two-dimensional bloodstream map only by calculating the change ratio of the light-receiving amount at respective pixels of the laser speckles in the step of calculating the change ratio of the light-receiving amount. Therefore, versatility is excellent.

(2) Since, based on the two-dimensional bloodstream map prepared by the step of preparing a two-dimensional bloodstream map, what portions where a change in the bloodstream is fast are connected to each other are made into what recess portions of the fingerprint or knuckle joint or lines on a palm are connected to each other, and what portions where a change in the bloodstream is slow are connected to each other are made into what ridge portions of the fingerprint or knuckle joint or lines on a palm are connected to each other, it is possible to easily acquire a ridge-and-recess pattern at the irradiation spot. By storing the ridge-and-recess pattern as the personal identification data in the step of storing personal identification data, the data may be used as personal identification data having excellent reliability, which is difficult to falsify, based on the living body information.

(3) With a single action of irradiating a laser beam in the laser beam-irradiating step, it is possible to acquire a plurality of living body information such as bloodstream distribution and concave/convex pattern at the irradiation spot, wherein the plurality of living body information can be used for highly accurate and composite personal identification.

Here, in the laser beam-irradiating step, the laser beam can be expanded by the optical system in accordance with the range (extent) of the irradiation spot onto which a laser beam is irradiated. The irradiation spot of a laser beam may be at least a part of a fingertip surface or palm, that is, it is sufficient if the spot or range may specify a specified person by detecting a ridge-and-recess pattern corresponding to a finger print or a knuckle joint and lines on a palm from the two-dimensional blood flow map. Further, the power and frequency of the laser beam may detect the bloodstream distribution at the irradiation spot, and may be appropriately selected in a range in which a ridge-and-recess pattern capable of specifying a specified person may be prepared. Also, where a laser beam is irradiated onto a plurality of fingertip surfaces at the same time, information regarding the positional relationship of ridge-and-recess patterns of the respective fingers may be acquired as personal identification data, wherein accuracy of personal identification can be improved.

Any type of light that can irradiate a laser beam may be used as a light source used in the laser beam-irradiating step. However, a small-sized type such as a semiconductor laser is preferable in view of being excellent in handling and space saving.

In addition, an irradiation spot-warming step may be provided as a pre-step of the laser beam-irradiating step or in the course of the laser beam-irradiating step. Therefore, it is possible to promote bloodstream at the irradiation spot in a cold region or for a person whose fingertip bloodstream is not sufficient, and a two-dimensional bloodstream map may be prepared without fail, wherein the reliability of data acquisition may be improved.

The laser beam irradiated in the laser beam-irradiating step is reflected from subcutaneous blood vessel layers at the irradiation spot, and the reflected light is imaged on an image sensor in the imaging step. However, since light scattered from skin tissue and blood cells interfere with each other, laser speckles (random speckle pattern) are brought about on the image surface. The laser speckles change from time to time due to movement of blood cells and scattering particles, and the change with the passage of time (hereinafter merely called "time change") is proportional to the speed of particles and the bloodstream velocity.

Accordingly, by calculating the change ratio (rate of time change) of the light-receiving amount at respective pixels in the step of calculating a change ratio of the light-receiving amount, it is possible to prepare a two-dimensional bloodstream map. The change ratio of the light-receiving amount calculated in the step for calculating the change ratio of the light-receiving amount may be an average time change ratio of the light-receiving amount or may be a reciprocal of the change degree of the light-receiving amount integrated in accordance with the exposure time of an image sensor.

That is, an image formed by reflection light from blood cells is guided to the image sensor, a number of such images are consecutively taken in at a predetermined time interval and stored, a predetermined number of images are selected from a number of the stored images, and a value obtained by totalizing the time change amounts of outputs at respective pixels of the respective images, or a value of a reciprocal number thereof is calculated, whereby it is possible to calculate the speed of the blood cells (bloodstream velocity) based on these figures. Since the output change amount of the respective pixels is associated with the movement speed of blood cells, it is possible to prepare a two-dimensional bloodstream map of the tissues of a living body based on the calculated output change amount of the respective pixels or the value of the reciprocal number.

As described above, the change ratio of the light-receiving amount is proportional to the average speed of scattering particles existing in an optical path through which a laser beam passes after being incident into skin, being scattered by internal blood cells and being emitted from the skin surface to the outside. Therefore, the longer the laser beam passes through a portion where the skin is thick and less bloodstream is provided, the less the change of the light-receiving amount becomes, and the time change is delayed. As a result, if a two-dimensional bloodstream map is prepared, the time change ratio of bloodstream is displayed to be small at a portion where the skin is thick while the time change ratio of bloodstream is displayed to be large at a portion, where the skin is thin, by being influenced by the bloodstream right below the thin skin portion. Therefore, it is possible to acquire a ridge-and-recess pattern corresponding to a fingerprint or a knuckle joint and lines on a palm.

Further, since the time change ratio of blood stream cyclically changes in synchronization with a heartbeat, the time change of the light-receiving amount, which is read per time of scanning when scanning the laser speckles by using the image sensor, becomes fast when the heart contracts and becomes slow when the heart expands. Therefore, if time changes of the time change ratio of bloodstream are obtained, life and death judgments can be carried out by utilizing the waveform, amplitude and cycle of the changes in bloodstream, and at the same time, comparison and judgment can be carried out based on the characteristic waveforms of a person, wherein it is possible to improve the accuracy of personal identification and the reliability is excellent.

A CCD type and a CMOS type area sensor may be preferably used as the image sensor. Where the image sensor is formed to be like a plane, distortion hardly occurs in an image, wherein reliability is excellent in the image process, simultaneously it is possible to easily downsize the apparatus, and it is excellent in handling and saving installation space.

The present invention is a method for acquiring personal identification data, including a configuration in which the change ratio of the light-receiving amount calculated in the step of calculating a change ratio of a light-receiving amount is an average time change ratio of the light-receiving amount.

With the configuration, the following actions can be brought about in addition to the actions described above.

(1) By calculating the average time change ratio of the light-receiving amount in the step of calculating a change ratio of the light-receiving amount, it is possible to simply calculate the change ratio of the light-receiving amount. And, based thereon, a two-dimensional bloodstream map of the irradiation spot may be prepared in the step of preparing a two-dimensional bloodstream map.

Here, a difference in the light-receiving amounts of the respective pixels is obtained with respect to images at two different times in the step of calculating a change ratio of the light-receiving amount, wherein the average time change ratio of the light-receiving amount can be calculated by dividing the difference by the time, and can be used as the change ratio of the light-receiving amount.

The present invention is a method for acquiring personal identification data, including a configuration in which the change ratio of the light-receiving amount calculated in the step of calculating a change ratio of the light-receiving amount is a reciprocal of a change degree of the light-receiving amount integrated in accordance with the exposure time of the image sensor.

With the configuration, the following action can be brought about in addition to the actions discussed above.

(1) The change ratio of the light-receiving amount may be accurately calculated by calculating the reciprocal of the change degree of the light-receiving amount, which is integrated in accordance with the exposure time of the image sensor, in the step of calculating a change ratio of the light-receiving amount. Based thereon, it is possible to prepare a two-dimensional bloodstream map of an irradiation spot in the step of preparing a two-dimensional bloodstream map.

Here, where an image on the image sensor has n×m pixels, if the value calculated in respective pixels, that is, a calculation value showing the bloodstream velocity is assumed to be an SBR value, for example, the following expression can be used.

$$SBR_{n,m} = <I_{n,m,t}>^2 / <|I_{n,m,t} - <I_{n,m,t}>|>^2 \quad \text{(Expression 1)}$$

In Expression 1, the $SBR_{n,m}$ shows, for example, SBR values at the nth and mth pixels of a series of time-series pixels picked up by N sheets for one second, and $I_{n,m,t}$ shows pixel output at time $t_i$ (i=1, 2, . . . N) at the nth and mth pixels. And < > shows the average value.

Therefore, the numerator of (Expression 1) shows a square of the average value within a predetermined duration of time of output of the nth and mth pixel changing to time. Also, the denominator of (Expression 1) shows a square of the average value of an absolute value of a differential between the pixel output $I_{n,m,t}$ in respective times of the nth and mth pixels and the average output value $<I_{n,m,t}>$ within a predetermined duration of time of the nth and mth pixels, and the denominator means a value corresponding to the scattering value of output change at the positions of the nth and mth pixels.

The higher the speed of change of the light amount becomes (the faster the fluctuation of speckles becomes), the more the amount integrated in the exposure time of the image sensor is increased, and the more the unevenness in the output fluctuation is reduced, therefore, the denominator of the SBR value of (Expression 1) is reduced, and the SBR value corresponding to the bloodstream velocity is increased.

Accordingly, by obtaining the SBR values from the pixel at the address of n=1 and m=1 and the pixel at the address of n=n and m=m, it is possible to obtain the bloodstream velocity corresponding to the SBR values, wherein a two-dimensional bloodstream map can be prepared.

A personal identification method is provided with a configuration including a step of comparing and judging, by which the personal identification data newly acquired by the method for acquiring personal identification data described above are compared for judgment with the pre-registered personal identification data at the irradiation spot of a person registered in advance.

With the configuration, the following action can be brought about in addition to the actions described above.

(1) By comparing for judgment the personal identification data newly acquired by the method for acquiring personal identification data with the pre-registered personal identification data at the same spot registered in advance in the comparing and judging step, it is possible to securely identify a specified person based on the living body information, wherein the reliability is excellent.

Here, by comparing an image of the personal identification data (ridge-and-recess pattern) newly acquired by the method for acquiring personal identification data with an image of the pre-registered personal identification data at the irradiation spot (the same spot) of a person registered in advance in the comparing and judging step, judgment is carried out. For example, personal identification may be carried out by overlapping the image of the newly acquired personal identification data and the image of the pre-registered personal identification data with each other, causing the same to slide forward and backward or leftward and rightward, and turning the same and comparing and judging how the characteristic points of both are coincident with each other.

In addition, the personal identification data registered in advance may be a ridge-and-recess pattern acquired by the method for acquiring personal identification data described above or may be a ridge-and-recess pattern (usual fingerprint or palm print) acquired by another method similar to the prior art.

Although it is difficult to falsify the personal identification data acquired by the method for acquiring personal identification data according to the present invention because the data changes from time to time, in the comparing and judging step in the personal identification method, the ridge-and-recess pattern at a specified point of time can be compared and judged by using the method similar to the prior art as it is, wherein the versatility thereof is excellent.

The present invention is a personal identification method, including a configuration by which the pre-registered personal identification data are the personal identification data acquired and registered in advance by the method for acquiring personal identification data described above.

With the configuration, the following action can be brought about in addition to the action discussed above.

(1) By using the ridge-and-recess pattern appearing in the subcutaneous two-dimensional bloodstream map as the personal identification data registered in advance, it is possible to easily and simply acquire, revise, compare and judge personal identification data by using the same apparatus, wherein the reliability of personal identification is high, and operation ability thereof is excellent.

Herein, the personal identification data may be stored in a hard disk drive and a memory, which is internally built into a personal identification apparatus or may be stored in a peripheral recording medium such as an IC chip or an IC tag, etc. Therefore, it is possible to identify a person by the comparing and judging step in a closed space without connecting the circuit to a data base. After a specified person is identified without fail, the circuit can be connected to the database, etc., wherein the safety for data protection is excellent.

The present invention is a personal identification method, including a configuration by which the comparing and judging step includes a step for judging life and death of a person by obtaining a time change of subcutaneous bloodstream in at least a part of the irradiation spot and comparing for judgment the same with the pre-determined reference.

With the configuration, the following action can be brought about in addition to the action discussed above.

(1) Since the comparing and judging step includes a step for judging life and death of a person by obtaining a time change of subcutaneous bloodstream in at least a part of a laser beam and comparing for judgment the same with the pre-determined reference, it is possible to securely prevent the personal identification data from being falsified, wherein the reliability is excellent.

Here, although it is sufficient if the step of judging life and death can check whether or not there is a time change of subcutaneous bloodstream, it is possible to reduce the error in measurement of the bloodstream by obtaining time changes of bloodstream values (average bloodstream) in an area in the irradiation spot for several seconds.

Waveform, amplitude and cycle of bloodstream changes may be preferably used as the pre-determined reference. By making comparison and judgment by using the waveform, amplitude and cycle of bloodstream changes, in which characteristics of a personal appear, as the reference, it is possible to specify not only life and death but also a specified personal, wherein falsification of personal identification data is made difficult, and the reliability of personal identification can be improved.

An apparatus for acquiring personal identification data has a configuration including: a laser beam-irradiating portion for irradiating a laser beam that is irradiated onto at least a part of a fingertip surface or a palm; an image sensor for receiving light reflected from subcutaneous blood vessel layers at an irradiation spot onto which the laser beam is irradiated by the laser beam-irradiating portion and imaging the same; and a calculation storing portion for calculating a change ratio of the light-receiving amount at respective pixels of the image sensor, preparing a two-dimensional bloodstream map of the irradiation spot, and storing a ridge-and-recess pattern of the irradiation spot, which appears in the two-dimensional bloodstream map, as personal identification data.

With the construction, the following action can be brought about.

(1) Since the laser beam can be selectively irradiated onto an optional position of a fingertip surface or a palm in an optional range by the laser beam-irradiating portion, and the image sensor can receive light reflected from subcutaneous blood vessel layers at the irradiation spot, where the laser beam is irradiated, and can image the same as laser speckles, a two-dimensional bloodstream map of the irradiation spot can be easily and simply prepared by only the calculation storing portion calculating a change ratio of the light-receiving amount at the respective pixels of the laser speckles, and a ridge-and-recess pattern of the irradiation spot can be obtained, wherein the ridge-and-recess pattern is stored as personal identification data, and can be utilized for personal identification based on living body information.

Here, the light source of the laser beam-irradiating portion is similar to that described above, in which a laser beam irradiated from a light source such as a semiconductor laser is expanded to a predetermined extent by an optical system and is preferably irradiated onto the irradiation spot.

Also, the direction of a palm may be an optional direction when the laser beam is irradiated from the laser beam-irradiating portion, for example, may be any of upward, downward and sideward. In addition, the laser beam may be directly applied to a fingertip surface or a palm or may be irradiated with a transparent protection plate made of, for example, glass and a synthetic resin, etc., provided between the laser beam-irradiating portion and hand. In particular, where the laser beam-irradiating portion is disposed downward, and a laser beam is irradiated upward, it is possible to prevent foreign substances or dusty matter from dropping onto the laser beam-irradiating portion and being adhered thereto by providing the protection plate, wherein the maintenance thereof becomes excellent.

By the protection plate being brought into contact with a fingertip surface or a palm since the bloodstream value is analyzed by detecting time change components of reflection light from the irradiation spot, influence on the change components is reduced even if the protection plate is stained, wherein a two-dimensional bloodstream map can be formed without fail. Furthermore, since there is a possibility that the bloodstream may change if the irradiation spot is intensively pressed by the protection plate, spacing is secured so that the protection plate is not brought into direct contact with a fingertip surface or a palm where the protection plate is provided, or the protection plate is disposed so that the fingertip surface or the palm may be softly brought into contact with the protection plate, whereby such a configuration is preferable because the re-appearance of data is excellent. Where a support portion having a palm or a wrist placed and held or fixing the same is provided in the vicinity of the protection plate, it is possible to keep roughly fixed the spacing between the protection plate and a fingertip surface or a palm, wherein the usability thereof is excellent.

Where a displaying portion such as a display is provided to display a ridge-and-recess pattern stored as the two-dimensional bloodstream map prepared by the calculation storing portion and the personal identification data, it is possible to carry out work while visually checking the same, wherein an erroneous operation can be prevented from occurring, and the handling ability thereof is excellent.

Since the image sensor is as described in the first aspect, a description thereof is omitted.

Any type of calculation storing portion is sufficient if it is capable of calculating, processing and storing respective data based on the programs established in advance. For example, a chip, a microcomputer and a personal computer can be preferably used. Also, the processing in the calculation storing portion is similar to that in the step of calculating a change ratio of the light-receiving amount, the step of preparing a two-dimensional bloodstream map, and the step of storing personal identification data, all of which are described in the first aspect. Therefore, a description thereof is omitted.

In addition, where a writing portion is provided, which is capable of writing in an IC chip, etc., personal identification data such as a two-dimensional bloodstream map and a concave/convex pattern, which are prepared in the calculation storing portion, and various types of personal information such as the name, age and sex of a person, etc., the personal identification data acquired by the personal identification method according to the present invention are registered therein, and the writing portion can be used as a personal identification data writing device capable of preparing an IC card, a driver's license, a cash card, a credit card, a passport, etc., which are carried by a person.

Also, an irradiation spot warming portion using a heater such as a far-infrared light irradiator may be provided, by which a fingertip and a palm may be warmed before or during irradiation of a laser beam from the laser beam-irradiating portion. Therefore, it is possible to promote the bloodstream at the irradiation spot in a cold region or for a person whose fingertip bloodstream is not sufficient, and a two-dimensional bloodstream map can be prepared without fail, wherein the reliability of data acquisition can be improved.

A personal identification apparatus has a configuration including: a laser beam-irradiating portion for irradiating a laser beam onto at least a part of a fingertip surface or a palm; an image sensor for receiving light reflected from subcutaneous blood vessel layers at an irradiation spot onto which the laser beam is irradiated by the laser beam-irradiating portion and imaging the same; a calculation storing portion for calculating a change ratio of the light-receiving amount at respective pixels of the image sensor, preparing a two-dimensional bloodstream map of the irradiation spot, and storing a ridge-and-recess pattern of the irradiation spot, which appears in the two-dimensional bloodstream map, as personal identification data; and a comparing and judging portion for comparing, for judgment, the personal identification data newly stored by the calculation storing portion with the pre-registered personal identification data at the irradiation spot of a personal registered in advance.

With the configuration, the following action can be brought about in addition to the action discussed above.

(1) By comparing, for judgment, the personal identification data newly stored by the calculation storing portion with the pre-registered personal identification data registered in advance at the same irradiation spot of a personal in the comparing and judging portion, it is possible to securely identify a person based on the living body information, wherein the reliability is excellent.

Here, the personal identification apparatus is such that the comparing and judging portion is added to the apparatus for acquiring personal identification data discussed above. Therefore, a description is omitted of the laser beam-irradiating portion, the image sensor, and the calculation storing portion that are common to both the apparatuses. Further, a description is omitted of the comparing and judging method in the comparing and judging portion because the method is similar to the comparing and judging step described above.

Also, the comparing and judging portion may be provided separately from the calculation storing portion. However, it may be incorporated in the calculation storing portion. In further detail, it is sufficient if a chip or microcomputer or a personal computer provided with the calculation storing portion and the comparing and judging portion is available.

The pre-registered personal identification data may be stored in an internal memory of the calculation storing portion or may be stored in various types of recording media such as an IC chip and an IC card, etc. If the pre-registered personal identification data are stored in a recording medium such as an IC card and a passport with an IC tag in which data cannot be interpolated or manipulated, it is not necessary to store the pre-registered personal identification data in the personal identification apparatus. A person may carry the pre-registered personal identification data at all times. Therefore, in a place where a personal identification apparatus is installed, it is possible that collation is simply and easily carried out between a recording medium, in which the pre-registered personal identification data are stored, and the owner (the said person), thereby being able to identify a specified person. Therefore, it is not necessary to connect to a network and carry out communications with a database, wherein the versatility and reliability are excellent.

In addition, it is preferable that, when storing the pre-registered personal identification data in a recording medium, the personal identification data cannot be reproduced only from the data by processing the data by means of encipherment. Even in a case where the recording medium is stolen or missing, it is possible to effectively prevent the living body information based on the pre-registered personal identification data from being falsified.

Where a display portion such as a display is provided, since operation can be carried out while visually checking newly stored personal identification data and the pre-registered personal identification data, an erroneous operation can be prevented from occurring, wherein the handling ability is excellent. Also, since the bloodstream changes from time to time, it is possible to observe the situation, in which the bloodstream changes in synchronization with heartbeat, in real time by displaying the waveforms and amplitude of the bloodstream, wherein the usability is excellent.

Where an irradiation spot warming portion using a heater such as a far-infrared light irradiator is provided as in the apparatus for acquiring personal identification data, it is possible to make almost equivalent the temperature condition when acquiring personal identification data for registration in the apparatus for acquiring personal identification data and the temperature condition when acquiring personal identification data for identification of a person in the personal identification apparatus. Therefore, it is possible to acquire data in a state of almost the same bloodstream at the irradiation spot almost without being influenced by body temperature, ambient temperature and blood pressure, etc., wherein the reliability of personal identification can be improved.

The present invention is a personal identification apparatus has a configuration including a data reading portion for reading the pre-registered personal identification data, which are registered in a peripheral recording medium.

With the configuration, the following actions can be brought about in addition to the action discussed above.

(1) Since the apparatus is provided with the data reading portion for reading the pre-registered personal identification data which is registered in a peripheral recording medium, it is not necessary to cause the apparatus itself to store the pre-registered personal identification data, wherein the load of the apparatus can be reduced, and at the same time, it is possible to prevent the pre-registered personal identification data from leaking and being broken. Thus, the maintenance ability and reliability are excellent.

(2) Since the data reading portion reads the pre-registered personal identification data registered in a peripheral recording medium, and compares, for judgment, the same with the personal identification data acquired by the apparatus for acquiring personal identification data, identification of a specified person can be simply carried out at a site, wherein it is possible for a specified person to control and carry the pre-registered personal identification data, wherein the versatility and reliability are excellent.

Here, an IC chip and an IC card, which are described above, may be preferably used as the peripheral recording medium in which the pre-registered personal identification data are stored. An IC card exclusive to identification of a person may be prepared, or an IC chip in which the pre-registered personal identification data are stored is incorporated in a resident's identification card, a driver's license, a staff-member identification card, a student identification card, a health insurance card, and a passport, etc., issued by respective municipal authorities, whereby a feature of identification of a person may be added thereto. Therefore, a person may easily carry the personal identification data, and identification of a person can be simply carried out by a portable type or a mobile type personal identification apparatus, wherein the versatility and handling ability are excellent. If such a card is lost, there is no fear of abuse of the same because of identification of a person based on living body information.

EFFECTS OF THE PRESENT INVENTION

As described above, with the method for acquiring personal identification data, the personal identification method, the apparatus for acquiring personal identification data and the personal identification apparatus according to the present invention, advantageous effects can be brought about as described below.

According to the method for acquiring personal identification data of the present invention, the following effect can be brought about.

(1) Since the laser beam-irradiating step irradiates a laser beam onto a part of a fingertip surface or a palm, the imaging step receives light reflected from the subcutaneous blood vessel layers at the irradiation spot where the laser beam is irradiated, and forms an image on the image sensor as laser speckles, it is possible to simply prepare a two-dimensional bloodstream map of the irradiation spot in the step of preparing a two-dimensional bloodstream map only by calculating the change ratio of the light-receiving amount at respective pixels of the laser speckles in the step for calculating a change ratio of the light-receiving amount. And, based on the two-dimensional bloodstream map, it is possible to obtain a ridge-and-recess pattern corresponding to the fingerprint or knuckle joint and lines on a palm of the irradiation spot. Therefore, by storing the ridge-and-recess pattern as personal identification data based on the living body information in the step for storing personal identification data, it is possible to provide a method for acquiring personal identification data, having excellent reliability, capable of acquiring personal identification data having excellent reliability, which are difficult to be falsified.

(2) It is possible to provide a method for acquiring personal identification data having excellent usability and capable of easily calculating the change ratio of the light-receiving amount by calculating the average time change ratio of the light-receiving amount in the step of calculating a change ratio of the light-receiving amount, and based thereon, capable of preparing a two-dimensional bloodstream map of the irradiation spot in a short time in the step of preparing a two-dimensional bloodstream map.

(3) It is possible to provide a method for acquiring personal identification data, having excellent reliability, capable of accurately calculating the change ratio of the light-receiving amount by calculating a reciprocal of the change degree of the light-receiving amount integrated by the exposure time of the image sensor in the step of calculating a change ratio of the light-receiving amount, and based thereon, capable of preparing an accurate two-dimensional bloodstream map of the irradiation spot in the step of preparing a two-dimensional bloodstream map.

According to the personal identification method of the invention, the following effects can be brought about.

(1) It is possible to provide a personal identification method having high accuracy and excellent reliability, by which personal identification data are difficult to be falsified, capable of securely carrying out identification of a person based on the living body information by comparing, for judgment, the personal identification data newly acquired by the method for acquiring personal identification data with the pre-registered personal identification data of the same spot registered in advance in the comparing and judging step.

(2) Since a specified person is identified by the personal identification data based on the living body information, it is possible to provide a personal identification method having excellent reliability, by which impersonation is impossible with falsification or by a cut-off finger or a cut-off hand.

(3) By using a ridge-and-recess pattern appearing in a subcutaneous two-dimensional bloodstream map as the personal identification data registered in advance, it is possible to provide a personal identification method having excellent reliability and operability, by which acquisition, revision, comparison and judgment of personal identification data can be easily carried out by using the same apparatus.

(4) By obtaining time changes of the subcutaneous bloodstream in at least a part of the laser beam, comparing the change with the pre-determined reference and judging the same in the step of judging life and death, it is possible to provide a personal identification method having excellent reliability and capable of judging life and death of a person executing composite identification of a person, by which falsification of the personal identification data can be prevented without fail.

According to the apparatus for acquiring personal identification data, of the invention, the following effect can be brought about.

(1) Since a laser beam is selectively irradiated onto an optional position of a fingertip surface or a palm in an optional range by the laser beam-irradiating portion, and the image sensor receives light reflected from the subcutaneous blood vessel layers of the irradiation spot where the laser beam is irradiated, and forms an image thereof as laser speckles, it is possible to provide an apparatus for acquiring personal identification data, having excellent reliability, where personal identification data are difficult to be falsified, and capable of easily preparing a two-dimensional bloodstream map of the irradiation spot, obtaining a ridge-and-recess pattern of the irradiation spot, storing the ridge-and-recess pattern as the personal identification data, and utilizing the data for identification of a person based on the living body information.

According to the personal identification apparatus of the invention, the following effect can be brought about.

(1) It is possible to provide a personal identification apparatus having excellent reliability and capable of securely identifying a specified person based on the living body information by comparing, for judgment, the personal identification data newly acquired in the calculation storing portion with the pre-registered personal identification data of the same irradiation spot of a person, which is registered in advance.

(2) By providing a data reading portion for reading the pre-registered personal identification data registered in a peripheral recording medium, it is possible to provide a personal identification apparatus, having excellent maintenance ability and excellent reliability in data preservation, in which there is no need to store the pre-registered personal identification data, and capable of reducing the load of the apparatus, bringing the pre-registered personal identification data stored in a recording medium such as an IC card in which data cannot be interpolated or manipulated, identifying a person between the recording medium and an owner (the said person) without requiring any communication with peripherals by connecting to a network, and preventing leakage and breakage of the pre-registered personal identification data.

DESCRIPTION OF REFERENCE NUMERALS

Figure 1:
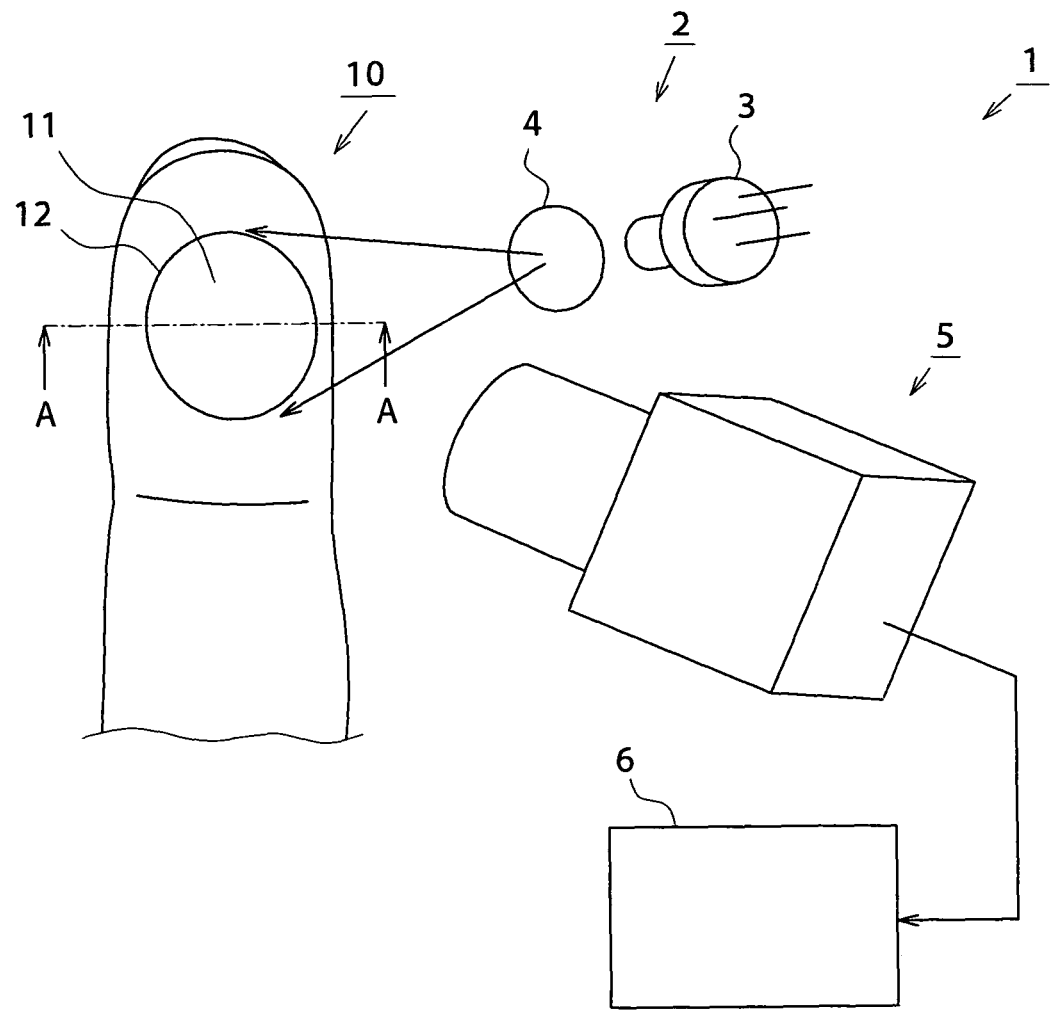
FIG. 1 is a schematic perspective view showing a configuration of an apparatus for acquiring personal identification data used in a method for acquiring personal identification data according to Embodiment 1 of the present invention.

1 Apparatus for acquiring personal identification data
2 Laser beam irradiation portion
3 Light source
4 Irradiation optical system
5 Image sensor
6 Calculation storing portion
7 Comparing and judging portion
8 Data reading portion
9 Display portion
10 Finger of hand
11 Irradiation spot
12 Laser spot
13 Skin surface
14 Ridge
15 Recess
16 Blood vessel layer
20 Ridge-and-recess pattern

BEST MODE FOR CARRYING OUT THE PRESENT INVENTION

Hereinafter, a description is given of a method for acquiring personal identification data, a personal identification method, an apparatus for acquiring personal identification data, and a personal identification apparatus according to embodiments of the present invention with reference to the accompanying drawings.

Embodiment 1

FIG. 1 is a schematic perspective view showing a configuration of an apparatus for acquiring personal identification data used in a method for acquiring personal identification data according to Embodiment 1 of the present invention.

In FIG. 1, reference numeral 1 denotes an apparatus for acquiring personal identification data used in a method for acquiring personal identification data according to Embodiment 1. Reference numeral 2 denotes a laser beam-irradiating portion of the apparatus 1 for acquiring personal identification data for irradiating a laser beam onto at least a part of the surface of a fingertip 10 or a palm. Reference numeral 3 denotes a light source, such as a semiconductor laser, of the laser beam-irradiating portion 2. Reference numeral 4 denotes an irradiation optical system of the laser beam-irradiating portion 2 for irradiating a laser beam to an irradiation spot 11 of the surface of the fingertip 10 by expanding the laser beam irradiated from the light source 3 to a predetermined extent. Reference numeral 5 denotes a CCD type image sensor of the apparatus 1 for acquiring personal identification data for receiving light reflected from the subcutaneous blood vessel layers of the irradiation spot 11 to which the laser beam is irradiated, and for forming an image thereof. Reference numeral 6 denotes a calculation storing portion of the apparatus 1 for acquiring personal identification data, which calculates a change ratio of the light-receiving amount at respective pixels of the image sensor 5, prepares a two-dimensional bloodstream map of the irradiation spot 11, and stores a ridge-and-recess pattern of the irradiation spot appearing in the two-dimensional bloodstream map as the personal identification data. Reference numeral 10 denotes a finger of a person, which is an object matter from which personal identification data are acquired. Reference numeral 11 denotes an irradiation spot positioned at the surface of the fingertip 10 to which a laser beam is irradiated. And reference numeral 12 denotes a laser spot irradiated from the laser beam-irradiating portion 2 to the irradiation spot 11.

Next, a detailed description is given of a fingertip that is an object matter from which personal identification data are acquired.

Figure 2:
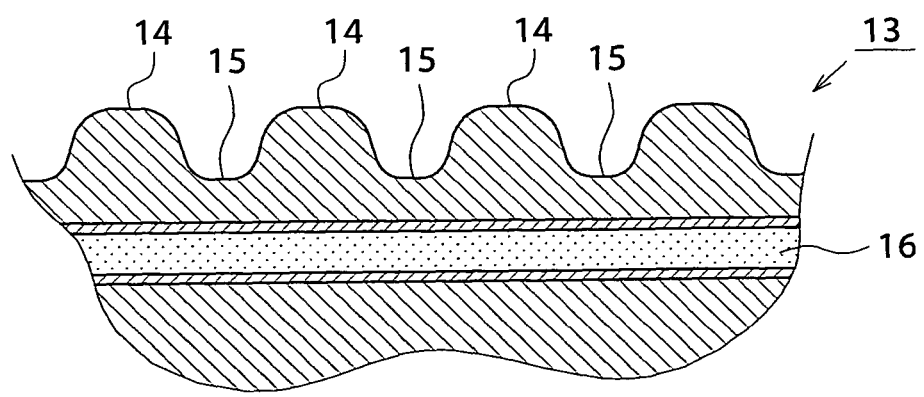
FIG. 2 is a schematic enlarged sectional view taken along the line A-A in FIG. 1.

FIG. 2 is a schematic enlarged sectional view taken along the line A-A in FIG. 1.

In FIG. 2, reference numeral 13 denotes the skin of the surface of a fingertip 10. Reference numeral 14 denotes ridges of the skin surface 13, and 15 denotes recess thereof. Reference numeral 16 denotes subcutaneous blood vessel layers of the surface of the fingertip 10.

Based on the actions of the apparatus for acquiring personal identification data constructed as described above, a detailed description is given of a method for acquiring personal identification data according to Embodiment 1.

First, the laser beam irradiated from the light source 3 of the laser beam-irradiating portion 2 is expanded to a predetermined extent by the irradiation optical system 4 in the laser beam-irradiating step, and is irradiated onto the irradiation spot 11. The laser beam is reflected from the subcutaneous blood vessel layers 16 (Refer to FIG. 2) of the irradiation spot 11 and is imaged on the image sensor 5 in the imaging step. In the meantime, since lights scattered due to skin tissue and blood cells interfere with each other, laser speckles (random speckle pattern) are brought about on the imaging surface. The laser speckles change from time to time due to movement of scattering particles such as blood cells, and the time change is proportional to the particle speed, that is, the bloodstream velocity.

Next, a two-dimensional bloodstream map can be prepared in the step for preparing a two-dimensional bloodstream-map, which is the next step, by calculating the change ratio (the speed of time changes) at respective pixels of the image formed on the image sensor 5 in the step for calculating a change ratio of the light-receiving amount. The change ratio of the light-receiving amount, which is calculated in the step of calculating a change ratio of the light-receiving amount, may be the average time change ratio of the light-receiving amount or may be a reciprocal of the change degree of the light-receiving amount integrated in accordance with the exposure time of the image sensor. The change ratio of the light-receiving amount is proportional to the average speed of the scattering particles in an optical path where the laser beam passes through until it comes out of the skin surface after it is incident into the skin and is scattered by internal blood cells. Therefore, the longer the laser beam passes through a portion where the skin surface 13 is thick and the bloodstream is less, the less the light-receiving amount is changed, and the more the time change thereof is delayed. As a result, if the two-dimensional bloodstream map is prepared, the time change ratio of the bloodstream is displayed to be small at a portion of ridges 14 where the skin 13 is thick, and the time change ratio of the bloodstream is displayed to be large, being reflected by the bloodstream velocity in the blood vessel layers 16 right below the portions of recess 15 where the skin 13 is thin, wherein a ridge-and-recess pattern corresponding to a fingerprint or a knuckle joint and lines on a palm can be obtained.

A further detailed description is given of the step of calculating a change ratio of light-receiving amount.

Where the average time change ratio of the light-receiving amount is used as the change ratio of the light-receiving amount in the step of calculating a change ratio of the light-receiving amount, a difference between the light-receiving amounts of the respective pixels is obtained in regard to images at two different times, and it becomes possible to calculate the average time change ratio of the light-receiving amount by dividing the difference by the time.

Next, where a reciprocal of the change degree of the light-receiving amount, which is integrated in accordance with the exposure time of the image sensor is used in the step of calculating the change ratio of the light-receiving amount, if the image on the image sensor 5 includes pixels of n×m, the SBR value showing the bloodstream velocity at the respective pixels can be expressed by the above-described (Expression 1).

The higher the speed of change of the light amount becomes (the faster the speckle fluctuation becomes), the more the amount integrated in the exposure time of the image sensor 5 is increased, and the more the unevenness in the output fluctuation is reduced. Therefore, the denominator of the SBR value of (Expression 1) is reduced, and the SBR value corresponding to the bloodstream velocity will be increased.

Accordingly, by obtaining the SBR values from the pixel of an address n=1 and m=1 to the pixel of an address n=n and m=m, it is possible to obtain the bloodstream velocity corresponding to the SBR value, wherein a two-dimensional bloodstream map can be prepared.

Finally, by storing the ridge-and-recess pattern at the irradiation spot 11 appearing in the two-dimensional bloodstream map as the personal identification data in the calculation storing portion 6 in the step of storing personal identification data, the data can be used as the personal identification data based on the living body information and having excellent reliability, which are difficult to be falsified.

The irradiation spot 11 of the laser beam by the laser beam-irradiating portion 2 is not limited to the fingertip 10 surface, but it may be set to a spot and a range by which a personal can be specified by detecting a ridge-and-recess pattern corresponding to a fingerprint or a knuckle joint and lines on a palm. Therefore, the irradiation spot 11 may be at least a part of the fingertip 10 surface or a palm. Where a laser beam is simultaneously irradiated onto a plurality of finger surfaces, the information of positional relationship of the ridge-and-recess patterns of the respective fingers can be acquired by the personal identification data, wherein the accuracy of identification of persons can be improved. In addition, the power and frequency of the laser beam can be appropriately selected in a range in which the bloodstream distribution of the irradiation spot 11 can be detected and a person can be specified.

Further, in the present embodiment, a semiconductor laser that is small-sized and excellent in handling ability and can save space is used as the light source 3 of the laser beam-irradiating portion 2. However, the light source 2 is not limited thereto but may be any type that can irradiate a laser beam.

Also, the direction of a palm may be optional when irradiating a laser beam from the laser beam-irradiating portion 2. For example, it may be any of upward, downward or sideward. Further, the laser beam may be irradiated directly onto the fingertip 10 surface or a palm as in the present embodiment or may be irradiated with a transparent protection plate made of glass or a synthetic resin provided between the laser beam-irradiating portion 2 and the hand. In particular, where the laser beam-irradiating portion 2 is disposed downward and a laser beam is irradiated upward, it is possible to prevent foreign substances or dusty matter from dropping onto the laser beam-irradiating portion 2 and being adhered thereto by providing the protection plate, wherein the maintenance efficiency is excellent.

In the present embodiment, since the bloodstream value is analyzed by detecting the fluctuation components in time of the reflection light from the irradiation spot 11, influence exerted on the fluctuation components is slight if the protection plate is stained by the fingertip 10 surface or palm being brought into contact with the protection plate, wherein the two-dimensional bloodstream map can be formed without fail. Also, there is a possibility that the bloodstream changes if the irradiation spot 11 is intensively pressed by the protection plate. Therefore, if a protection plate is provided, it is preferable that spacing is provided so that the protection plate is not brought into direct contact with the fingertip 10 surface and palm, or it is devised that the fingertip 10 surface or palm is lightly brought into contact therewith, wherein the data reproduction ability becomes excellent. Where a supporting portion fixing a palm or a wrist by having a palm or a wrist placed therein or therebetween is provided in the vicinity of the protection plate, it is possible to keep roughly fixed the spacing between the protection plate and the fingertip 10 surface or palm, wherein the usability is excellent.

In the present embodiment, a CCD type image sensor is used as the image sensor 5. However, it may be a CMOS type sensor. In particular, wherein the image sensor 5 is formed to be flat, it is difficult for distortion to be brought about on the image, wherein the reliability of image processing is excellent, downsizing of the apparatus can be made easy, and excellent handling efficiency and space saving can be brought about.

Also, in the embodiment, a personal computer is used as the calculation storing portion 6 and respective data are calculated, processed and stored based on programs established in advance.

Where a display portion such as a display is provided in order to display a two dimensional bloodstream map prepared by the calculation storing portion 6 and a ridge-and-recess pattern stored as personal identification data, since operation can be carried out while visually checking the same, it is possible to prevent erroneous operations from occurring, wherein the handling efficiency is excellent.

In addition, an irradiation spot warming portion using a heater such as an far-infrared light irradiator may be provided, a step of warming an irradiation spot for warming a fingertip and a palm may be carried out as a pre-step of the step of irradiating a laser beam or during the step of irradiating a laser beam, by which a fingertip and a palm can be warmed before or during irradiation of a laser beam from the laser beam-irradiating portion. Therefore, it is possible to promote the bloodstream at the irradiation spot in a cold region or for a person whose fingertip bloodstream is not sufficient, and a two-dimensional bloodstream map can be prepared without fail, wherein the reliability of data acquisition can be improved.

Since the method for acquiring personal identification data according to Embodiment 1 is constructed as described above, the following actions may be brought about.

(1) Since a laser beam may be selectively irradiated onto an optional range at an optional position of a fingertip 10 surface or a palm by the laser beam-irradiating step, and light reflected from the subcutaneous blood vessel layers 16 at the irradiation spot 11 where a laser beam is irradiated may be received and imaged on the image sensor 5 as laser speckles by the imaging step, it is possible to simply prepare a two-dimensional bloodstream map of the irradiation spot 11 by the step of preparing a two-dimensional bloodstream map only by calculating the change ratio of the light-receiving amount at respective pixels of the laser speckles in the step of calculating the change ratio of the light-receiving amount. Therefore, versatility is excellent.

(2) Since, based on the two-dimensional bloodstream map prepared by the step of preparing a two-dimensional bloodstream map, what portions where a change in the bloodstream is fast are connected to each other are made into what recess portions of the fingerprint or knuckle joint or line on a palm are connected to each other, and what portions where a change in the bloodstream is slow are connected to each other are made into what ridge portions of the fingerprint or knuckle joint or palm are connected to each other, it is possible to easily acquire a ridge-and-recess pattern at the irradiation spot 11. By storing the ridge-and-recess pattern as the personal identification data in the step of storing personal identification data, the data can be used as personal identification data having excellent reliability, which is difficult to be falsified, based on the living body information.

(3) With a single action of irradiating a laser beam in the laser beam-irradiating step, it is possible to acquire a plurality of living body information such as bloodstream distribution and concave/convex pattern at the irradiation spot 11, wherein the plurality of living body information can be used for highly accurate and composite personal identification.

(4) Where the average time change ratio of the light-receiving amount is calculated in the step of calculating the change ratio of the light-receiving amount, it is possible to easily calculate the change ratio of the light-receiving amount, and it is also possible to prepare a two-dimensional bloodstream map of the irradiation spot in the step of preparing a two-dimensional bloodstream map based thereon.

(5) Where a reciprocal of the change degree of the light-receiving amount, which is integrated in accordance with the exposure time of the image sensor 5, is calculated in the step of calculating the change ratio of the light-receiving amount, it is possible to accurately calculate the change ratio of the light-receiving amount, and it is also possible to prepare an accurate two-dimensional bloodstream map of the irradiation spot in the step of preparing a two-dimensional bloodstream map based thereon.

Since the apparatus for acquiring personal identification data, which is used for the method for acquiring personal identification data, according to Embodiment 1 is constructed as described above, the following action can be brought about.

(1) Since a laser beam can be selectively irradiated onto an optional range at an optional position of a fingertip 10 surface or a palm by the laser beam irradiating portion 2, and light reflected from the subcutaneous blood vessel layers at the irradiation spot 11 where a laser beam is irradiated can be received by and imaged on the image sensor 5 as laser speckles, it is possible to simply prepare a two-dimensional bloodstream map of the irradiation spot 11 only by calculating the change ratio of the light-receiving amount at respective pixels of the laser speckles in the calculation storing portion and possible to obtain a ridge-and-recess pattern of the irradiation spot 11, wherein the ridge-and-recess pattern is stored as the personal identification data and can be utilized for identification of persons based on the living body information.

Embodiment 2

Figure 3:
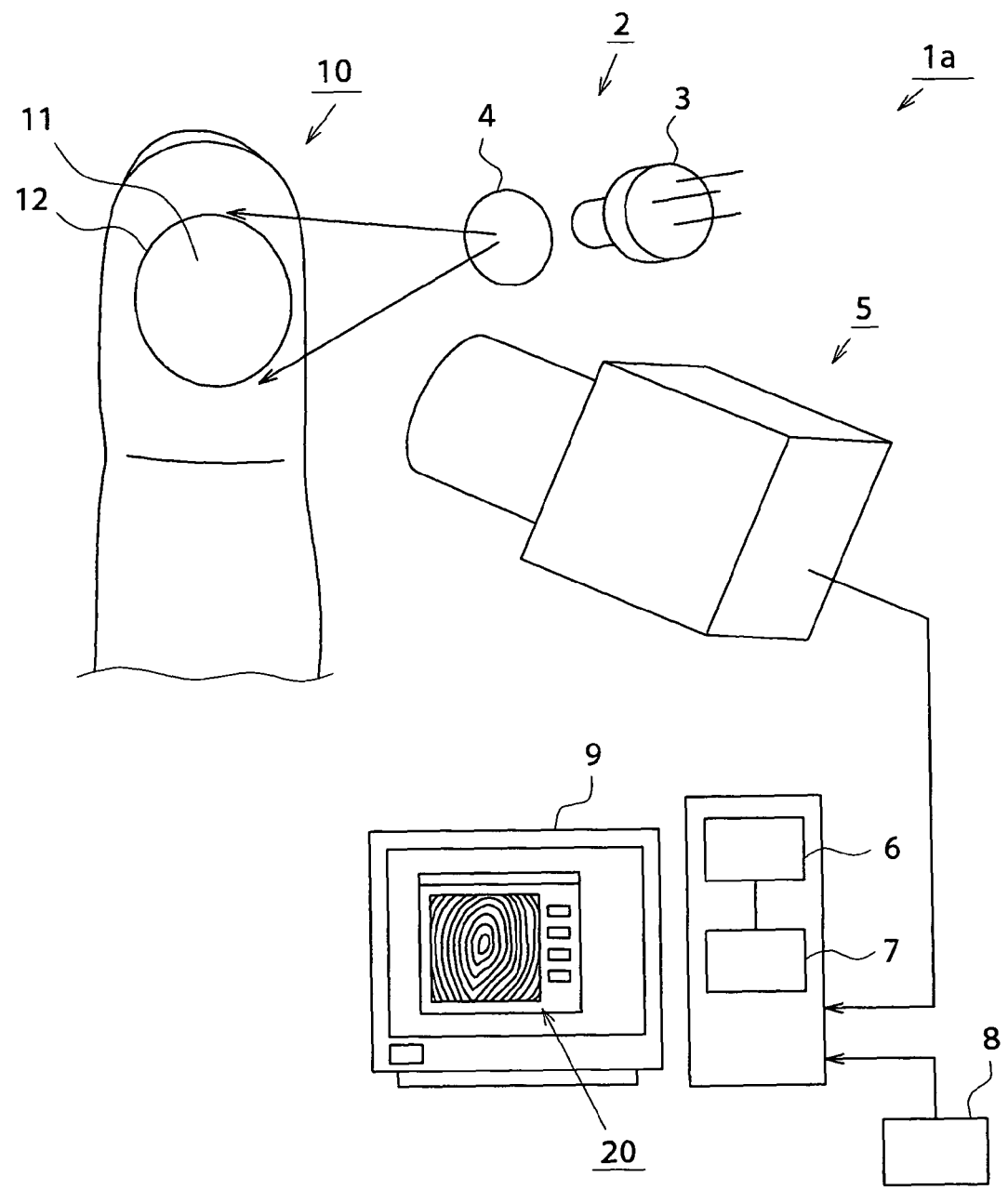
FIG. 3 is a schematic perspective view showing a configuration of a personal identification apparatus used for a personal identification method according to Embodiment 2 of the present invention.

FIG. 3 is a schematic perspective view showing a configuration of a personal identification apparatus used for a personal identification method according to Embodiment 2 of the present invention, wherein components that are identical to those of Embodiment 1 are given the same reference numerals, and description thereof is omitted.

In FIG. 3, points at which a personal identification apparatus 1a according to Embodiment 2 differs from that according to Embodiment 1 resides in that the apparatus 1a includes a comparing and judging portion 7 for comparing, for judgment, the personal identification data newly stored in the calculation storing portion 6 with the pre-registered personal identification data, of the irradiation spot 11, of persons registered in advance; the apparatus 1a includes a data reading portion 8 for reading the pre-registered personal identification data registered in a peripheral recording medium; and the apparatus 1a includes a display portion 9 such as a display to display the two-dimensional bloodstream map prepared in the calculation storing portion 6 and the ridge-and-recess pattern 20 stored as the personal identification data.

Further, reference numeral 20 denotes a ridge-and-recess pattern of the irradiation spot 11, which appears in the two-dimensional bloodstream map acquired by the method for acquiring personal identification data according to Embodiment 1 and displayed in the display portion 7.

The pre-registered personal identification data may be stored in an internal memory of the calculation storing portion 6 or may be stored in various types of peripheral recording media such as an IC chip and an IC card, etc., and the data may be read from the data reading portion 8. If the pre-registered personal identification data is stored in a recording medium such as an IC card and a passport with an IC tag, in which data falsifying is impossible, it is not necessary to store the pre-registered personal identification data in the calculation storing portion 6 of the personal identification apparatus 1a. It is possible for a person to carry the pre-registered personal identification data at all times. Therefore, in a place where a personal identification apparatus 1a with a data reading portion 8 is installed, it is possible that collation is simply and accurately carried out between a recording medium, in which the pre-registered personal identification data are stored, and the owner (the said person), thereby being able to identify a specified person. Therefore, it is not necessary to connect to a network and carry out communications with a database, wherein the versatility and reliability are excellent.

An IC card exclusive for identification of person may be prepared as a peripheral recording medium in which the pre-registered personal identification data are stored, or an IC chip having the pre-registered personal identification data stored therein is embedded in a resident's identification card, a driver's license, a staff-member identification card, a student identification card, a health insurance card, and a passport, etc., issued by respective municipal authorities, whereby a feature of identification of a person may be added thereto. Therefore, a person can easily carry the personal identification data, and identification of a person can be simply carried out by a portable type or a mobile type personal identification apparatus, wherein the versatility and handling ability are excellent. If such a card is lost, there is no fear to abuse the same because of identification of a person based on living body information.

In addition, where it is devised that, when storing the pre-registered personal identification data in a recording medium, the personal identification data cannot be reproduced only from the data by processing the data by means of encipherment, it is difficult to falsify the living body information from the pre-registered personal identification data stored in the recording medium, and reliability can be improved in view of data maintenance and personal identification.

Since, by providing a display portion 9 such as a display, operation can be carried out while visually checking the newly stored personal identification data and the pre-registered personal identification data, an erroneous operation can be prevented from occurring, wherein the handling ability is excellent. Also, since the bloodstream changes from time to time, it is possible to observe the situation, in which the bloodstream change in synchronization with heartbeat, in real time by displaying the waveforms and amplitude of the bloodstream, wherein the usability is excellent.

A detailed description is given of a person identification method according to Embodiment 2 of the present invention, based on the movements of the personal identification apparatus constructed as described above.

A point in which the personal identification method according to Embodiment 2 differs from the method for acquiring personal identification data according to Embodiment 1 resides in that the method according to Embodiment 2 includes a step of comparing, for judgment, the personal identification data newly acquired by the method for acquiring personal identification data according to Embodiment 1 with the pre-registered personal identification data, of the irradiation spot 11, of a person registered in advance.

By comparing, for judgment, the personal identification data (ridge-and-recess pattern 20) newly acquired by the method for acquiring personal identification data with the pre-registered personal identification data, of the irradiation spot (the same spot), of a person registered in advance in the comparing and judging step, judgment is carried out. For example, personal identification can be carried out by overlapping the image of the newly acquired personal identification data and the image of the pre-registered personal identification data with each other, causing the same to slide forward and backward or leftward and rightward, and turning the same and comparing and judging how the characteristic points of both are coincident with each other.

In addition, the personal identification data registered in advance may be a ridge-and-recess pattern acquired by the method for acquiring personal identification data according to Embodiment 1 or may be a ridge-and-recess pattern (usual fingerprint or palm print) acquired by another method similar to the prior art.

In the comparing and judging step, a step for judging life and death of a person may be carried out by obtaining a time change of subcutaneous bloodstream in at least a part of the irradiation spot 11 and comparing for judgment the same with the pre-determined reference. Since the time change ratio of bloodstream cyclically changes in synchronization with heart beat, when scanning laser speckles by means of the image sensor 5, the time change of the light-receiving amount read per scanning becomes fast when the heart contracts, and becomes slow when the heart expands. Therefore, if the time changes of the time change ratio to time of bloodstream are obtained, life and death judgment can be carried out by utilizing the waveforms, amplitude and cycle of the bloodstream changes, and comparison and judgment can be carried out based on the characteristic waveforms and cycle of a person, wherein the accuracy of personal identification can be improved, and reliability is excellent.

Where an irradiation spot warming portion using a heater such as a far infrared light irradiator is provided in an apparatus 1 for acquiring personal identification data according to Embodiment 1 and a personal identification apparatus 1a according to Embodiment 2, the temperature condition to acquire personal identification data for registration in the apparatus 1 for acquiring personal identification data can be made roughly equal to the temperature condition to acquire personal identification data for identification of a person in the personal identification apparatus 1a. Therefore, the personal identification data are hardly influenced by the body temperature, ambient temperature and blood pressure, etc., and data for the bloodstream of the irradiation spot 11 can be acquired under almost the same conditions, wherein the reliability of identification of persons can be improved.

Since the personal identification method according to Embodiment 2 is constructed as described above, the following actions can be brought about in addition to the actions similar to those of the method for acquiring personal identification data according to Embodiment 1.

(1) By comparing, for judgment, the personal identification data newly acquired by the method for acquiring personal identification data with the pre-registered personal identification data of the same spot, which has been registered in advance, in the comparing and judging step, it is possible to carry out identification of a person based on the living body information without fail, wherein the reliability is excellent.

(2) By using the ridge-and-recess pattern 20 appearing in the subcutaneous two-dimensional bloodstream map as the personal identification data registered in advance, it is possible to easily acquire, revise, compare and judge personal identification data by using the same apparatus, wherein the reliability of identification of a person is high, and work efficiency is excellent.

(3) Since the comparing and judging step includes a step of judging life and death of a person by obtaining time changes of subcutaneous bloodstream at least a part of a laser beam and comparing, for judgment the same, with the pre-determined reference, it is possible to securely prevent the personal identification data from being falsified, wherein the reliability is excellent.

Since the personal identification apparatus used for the personal identification method according to Embodiment 2 is constructed as described above, the following actions can be brought about in addition to the actions similar to those of the apparatus for acquiring personal identification data used for the method for acquiring personal identification data according to Embodiment 1.

(1) In the comparing and judging portion 7, by comparing, for judgment, the personal identification data newly stored in the calculation storing portion 6 with the pre-registered personal identification of the same irradiation spot 11 of a person registered in advance, identification of a person can be securely carried out based on the living body information, wherein the reliability is excellent.

(2) Since the apparatus includes a data reading portion 8 for reading the pre-registered personal identification data registered in a peripheral recording medium, it is not necessary to store the pre-registered personal identification data in the apparatus itself, wherein the load of the apparatus can be reduced, and at the same time, it is possible to prevent the pre-registered personal identification data from leaking or being destroyed. Thus, excellent maintenance and reliability can be brought about.

(3) Since the data reading portion 8 reads the pre-registered personal identification data registered in a peripheral recording medium, and compares, for judgment, the same with the personal identification data acquired by the apparatus 1 for acquiring personal identification data, identification of a specified person can be simply carried out at a site, wherein it is possible for a specified person to control and carry the pre-registered personal identification data, wherein the versatility and reliability are excellent.

INDUSTRIAL APPLICABILITY

The present invention provides: a method for acquiring personal identification data by extracting a ridge-and-recess pattern corresponding to a fingerprint or a knuckle joint and lines on a palm by utilizing characteristics by which subcutaneous bloodstream distribution is spatially modulated by the ridge-and-recess pattern on the surface when measuring a subcutaneous bloodstream distribution based on a bloodstream measuring technology utilizing laser scattering, and by acquiring the same as personal identification data based on living body information; a personal identification method, having high reliability, high accuracy and less likelihood of falsification, capable of carrying out personal identification by comparing for judgment the personal identification data acquired by the method for acquiring personal identification data with pre-registered personal identification data; an apparatus for acquiring personal identification data, the structure of which is simplified and handling of which is excellent, capable of preparing a two-dimensional subcutaneous bloodstream map of a fingertip surface and at a palm, and capable of acquiring the ridge-and-recess pattern appearing in the two-dimensional bloodstream map as personal identification data based on the living body information; and a personal identification apparatus, having high accuracy, high reliability and less likelihood of falsification, capable of acquiring the ridge-and-recess pattern appearing in the two-dimensional subcutaneous bloodstream map of a fingertip surface and at a palm as personal identification data based on the living body information, comparing for judgment the same with pre-registered personal identification data of persons, and carrying out personal identification. Therefore, the present invention is applicable to entrance and exit control in various types of facilities and/or buildings for which high security control is required and to emigration and immigration control.

What is claimed is:

1. A method for acquiring personal identification data to identify a specified person by measuring subcutaneous bloodstream, comprising the steps of:

irradiating a laser beam onto at least a part of a fingertip surface or a palm;

imaging light reflected from subcutaneous blood vessels at an irradiation spot to which the laser beam is irradiated in the laser beam-irradiating step by receiving the reflected light on an image sensor as laser speckles;

calculating, using a processor, a change ratio of a light-receiving amount at respective pixels of the laser speckles;

preparing a two-dimensional bloodstream map of the irradiation spot based on numerical values obtained in the step of calculating the change ratio of the light-receiving amount; and storing a ridge-and-recess pattern corresponding to a fingerprint, a knuckle joint, and lines on a palm of the irradiation spot appearing in the two-dimensional bloodstream map as personal identification data of the specified person.

2. The method for acquiring personal identification data according to claim 1, wherein the change ratio of the light-receiving amount calculated in the step of calculating the change ratio of the light-receiving amount is an average time change ratio of the light-receiving amount.

3. The method for acquiring personal identification data according to claim 1, wherein the change ratio of the light-receiving amount calculated in the step of calculating the change ratio of the light-receiving amount is a reciprocal number of a change degree of the light-receiving amount integrated in accordance with exposure time of the image sensor.

4. A personal identification method, comprising a step of comparing and judging, by which personal identification data newly stored by a method for acquiring personal identification data as set forth in claim 1 is compared, for judgment, with pre-registered personal identification data at the irradiation spot of a person registered in advance.

5. The personal identification method according to claim 4, wherein the pre-registered personal identification data is acquired and stored in advance by the method for acquiring personal identification data.

6. The personal identification method according to claim 4, wherein the comparing and judging step includes a step for judging life and death of a person by determining a time change of subcutaneous bloodstream in at least a part of the irradiation spot and comparing, for judgment, the same with a pre-determined reference.

7. An apparatus for acquiring personal identification data to identify a specified person by measuring subcutaneous bloodstream, comprising:
a laser beam-irradiating portion for irradiating a laser beam that is irradiated onto at least a part of a fingertip surface or a palm;
an image sensor for receiving light reflected from subcutaneous blood vessels at an irradiation spot onto which the laser beam is irradiated by the laser beam-irradiating portion and imaging the reflected light on an image sensor as laser speckles; and
a calculation storing portion for calculating a change ratio of a light-receiving amount at respective pixels of the image sensor, preparing a two-dimensional bloodstream map of the irradiation spot based on numerical values obtained from the calculated change ratio of the light-receiving amount, and storing a ridge-and-recess pattern corresponding to a fingerprint, a knuckle joint, and lines on a palm of the irradiation spot, which appears in the two-dimensional bloodstream map, as personal identification data of the specified person.

8. The apparatus according to claim 7, wherein the calculation storing portion calculates an average time change ratio of the light-receiving amount as the change ratio of the light-receiving amount.

9. The apparatus according to claim 7, wherein the calculation storing portion calculates a reciprocal number of a change degree of the light-receiving amount integrated in accordance with exposure time of the image sensor as the change ratio of the light-receiving amount.

10. An apparatus for identifying a person based on personal identification data including subcutaneous bloodstream data of the person, comprising:
a laser beam-irradiating portion for irradiating a laser beam that is irradiated onto at least a part of a fingertip surface or a palm;
an image sensor for receiving light reflected from subcutaneous blood vessels at an irradiation spot onto which the laser beam is irradiated by the laser beam-irradiating portion and imaging the reflected light on an image sensor as laser speckles;
a calculation storing portion for calculating a change ratio of a light-receiving amount at respective pixels of the image sensor, preparing a two-dimensional bloodstream map of the irradiation spot based on numerical values obtained from the calculated change ratio of the light-receiving amount, and storing a ridge-and-recess pattern corresponding to a fingerprint, a knuckle joint, and lines on a palm of the irradiation spot, which appears in the two-dimensional bloodstream map, as personal identification data of the specified person; and
a comparing and judging portion for comparing, for judgment, the personal identification data newly stored by the calculation storing portion with pre-registered personal identification data at the irradiation spot of a person registered in advance.

11. The apparatus according to claim 10, further comprising:
a data reading portion for reading the pre-registered personal identification data from a peripheral recording medium.

12. The apparatus according to claim 10, wherein the comparing and judging portion judges life and death of a person by determining a time change of subcutaneous bloodstream in at least a part of the irradiation spot and comparing, for judgment, the same with a pre-determined reference.

* * * * *